United States Patent [19]

Behr

[11] Patent Number: 5,055,951
[45] Date of Patent: Oct. 8, 1991

[54] METHOD AND APPARATUS FOR SERVO-POSITIONING MOVABLE TRANSDUCER HEADS

[75] Inventor: Michael I. Behr, Pasadena, Calif.

[73] Assignee: Irwin Magnetic Systems, Inc., Ann Arbor, Mich.

[21] Appl. No.: 321,915

[22] Filed: Mar. 10, 1989

[51] Int. Cl.$^5$ ............................................. G11B 5/596
[52] U.S. Cl. ........................ 360/77.120; 360/77.070
[58] Field of Search ................ 360/135, 77.01, 77.02, 360/77.05, 77.07, 77.11, 77.12

[56] References Cited

U.S. PATENT DOCUMENTS

| 4,007,493 | 2/1977 | Behr et al. | 360/77.110 |
| 4,321,634 | 3/1982 | Lehureau | 360/77.120 |
| 4,347,534 | 8/1982 | Kimura | 360/77.120 |
| 4,587,579 | 5/1986 | Cocke et al. | 360/77.030 |
| 4,823,205 | 4/1989 | Hannon et al. | 360/77.030 |

FOREIGN PATENT DOCUMENTS

| 8904040 | 5/1989 | PCT Int'l Appl. | 360/77.070 |
| 2064830 | 6/1981 | United Kingdom | 360/77.110 |

Primary Examiner—Aristotelis Psitos
Assistant Examiner—David L. Robertson
Attorney, Agent, or Firm—Price, Heneveld, Cooper, DeWitt & Litton

[57] ABSTRACT

The specification discloses a method and apparatus for servo-positioning moveable transducer heads and the like by means of time-based servo system utilizing a particular type of servo pattern or format recorded on a data storage member, e.g., magnetic tape or disk, and having first and second sets of servo lines that extend angularly across the recording media from opposite sides thereof convergently toward one another. The individual lines in each such set of recorded servo information extend alongside one another without intersecting, and in a preferred embodiment the two sets of servo lines intersect along a medial portion of the recording media, to define a uniform series of angles disposed adjacent one another along the recording member, a preferred such pattern having a chevron-like appearance. The overal servo patern formed by the two sets of servo lines preferably extends across substantially the entire usable surface of the recording media to provide continuous servo-positioning. Data is written over the same surface as the servo pattern, preferably by recording each different type of information in different levels of the recordable media, and preferably at a substantial difference in azimuth angle, whereby read-write isolation between the servo and data is further achieved. The specification also discloses a calibration means comprising a separately-recorded parallel information track by which any offset present between the servo heads and the data heads of individual drives may be determined and utilized in read-write operations to insure complete accuracy in tracking.

62 Claims, 4 Drawing Sheets

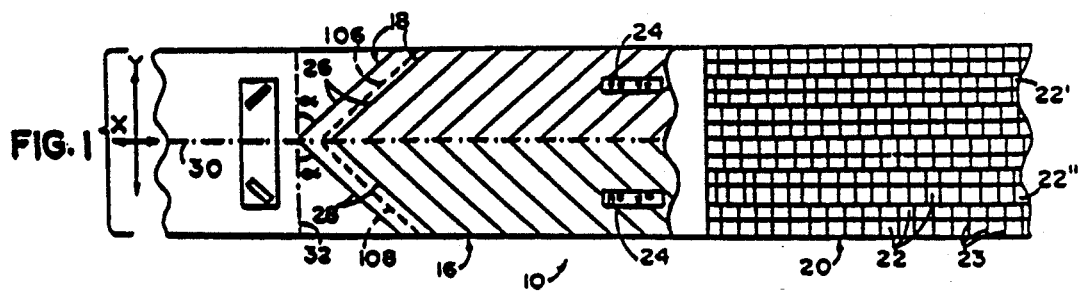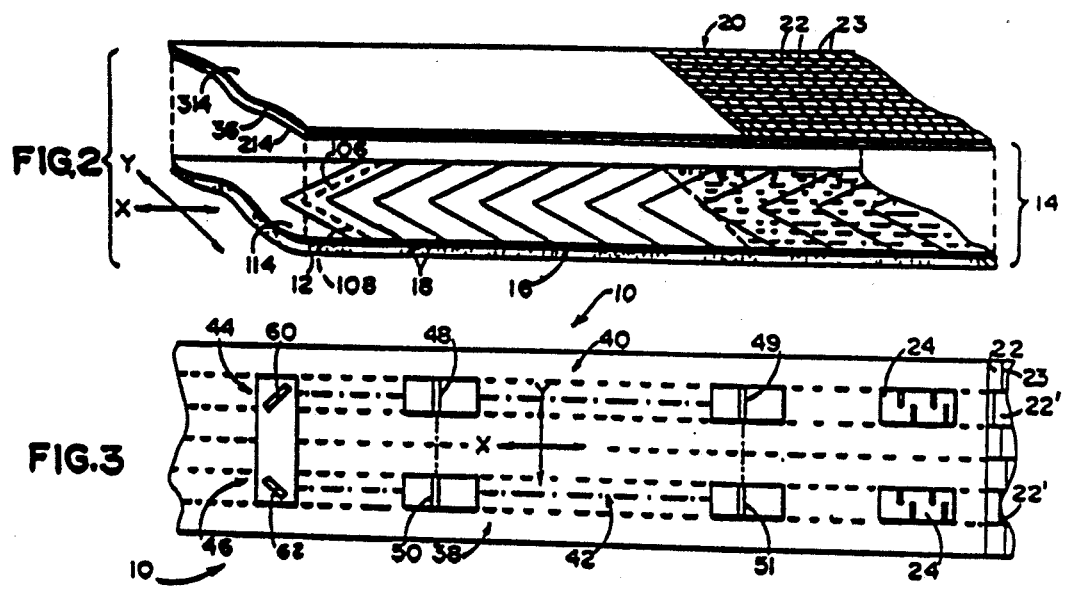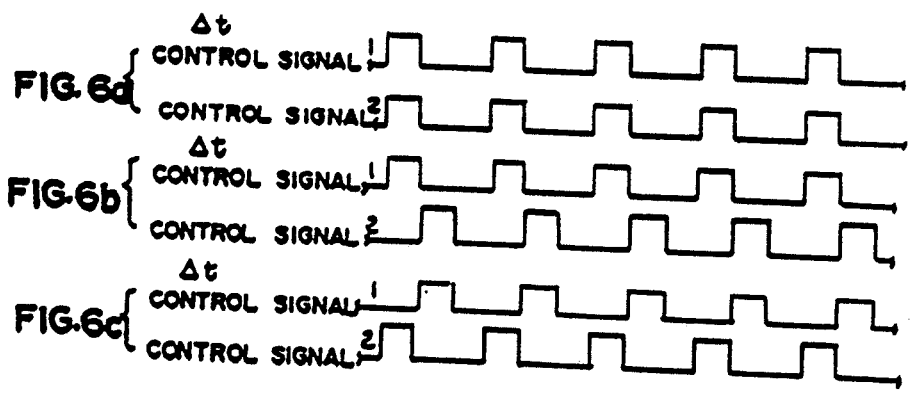

METHOD AND APPARATUS FOR SERVO-POSITIONING MOVABLE TRANSDUCER HEADS

The present invention relates generally to the field of servo control systems for positioning one or more transducer heads relative to the recording media in data-storage devices as the media is transported past the heads, such that the head(s) will locate and follow along a selected one of many data tracks on the media. More particularly, the invention pertains to the recording and reproducing of servo information on the media in a novel and advantageous format and located proximate to or beneath one or more data tracks.

More particularly still, in its most preferred form, the invention relates to a novel servo-positioning format which makes possible a time-based positioning system. The novel format has broad potential application to various forms of data-recording media having prerecorded track-identifying and track-following servo information recorded thereon, but in a particular embodiment is especially advantageous, together with the preferred systems for utilizing such format, in connection with tape-form record members, i.e., magnetic tape. In broader aspects of the invention, however, the encoding and decoding techniques for track identification and the improved servo format involved are potentially applicable to other forms of record member and other types of media, including disks.

BACKGROUND OF THE INVENTION

As the track density employed on data-storage media continually increases, the need for accurate and precise head positioning becomes ever greater. Recording media having particularly high track densities may include, among others, hard or flexible disk memory and magnetic recording tape. Typically, to achieve precise head positioning, a servo head is coupled to the data head so that data head position is made a direct function of servo head position. Accordingly, by controlling the position of the servo head, the data head can also be controlled, so as to remain properly aligned with a track upon which data is either being recorded ("written") or reproduced ("read").

In a typical servoing arrangement, the servo head is controlled by coordinating its position with servo information prerecorded on the media either along the data tracks or on one or more separate tracks. Currently, three types of servo systems are employed on magnetic media, namely amplitude-based, frequency-based, and phase or time-based. With the amplitude-based servo patterns, perceived differences in amplitude between successive sections of the servo pattern are used to obtain position information. Many such systems use various pulse-coding schemes as well, and a good example of an application of such an amplitude-based servo system relevant to the magnetic recording tape field is fully discussed, and incorporated by reference herein, U.S. Pat. No. 4,472,750, issued to Klumpp et al., which interleaves the servo fields with the data fields.

Pulse-type amplitude detection-based servo patterns have found widespread use in disk drives. These types of patterns are often found in a dedicated servo environment and are to some extent amplitude-based. Such servo patterns may employ so-called dibit, tribit, or quadbit formats to encode position information. Alternatively, pulse detection-based servo patterns may be embedded on disks or recording tape, wherein the servo information is added to a header portion of a data track or segment.

As well illustrated in prior U.S. Pat. No. 4,007,493, which shares common inventorship with the instant application, a time-based system may be implemented by using a pair of mutually-spaced servo tracks disposed along opposite sides of a data track. This system operates by comparing the timing differences resulting from detection of the transitions in the two tracks, generated by moving the storage media (i.e., rotating a disk) under two spaced heads. More specifically, the two such servo tracks have different servo line densities and when moved under the associated heads thus generate output pulse trains of different pulse repetition rates. The positioning of sensing transducers in such a system is accomplished by measuring the time relationship between the output pulses from the two different servo tracks. While such a servoing scheme represents a potentially great advance over amplitude-based servoing, this particular system still possesses some of the disadvantages typically associated with prior art dedicated servo systems. More specifically, as disclosed, this prior patent teaches the use of two substantially different servo tracks, and such tracks are formed by recorded servo lines which use the same surface as the data tracks, with the data lines adjacent to but segregated from the servo lines. Consequently, a considerable portion of the disk in such a system is dedicated to tracks of servo patterns, upon which data cannot be recorded. Additionally, the use of two separate and different mutually-spaced servo tracks to position the transducer for a single data zone creates complex problems in actual implementation and further diminishes the amount of space on the record member which can be devoted to data.

In order to free up additional space for data tracks on recording media, and thus improve the efficiency of data storage on the media, "burying" the servo patterns beneath the surface upon which data is written has been proposed heretofore. For example, buried servo schemes have been disclosed in such references as U.S. Pat. No. 3,614,756 (McIntosh), U.S. Pat. No. 3,956,769 (Beecroft et al.), and U.S. Pat. No. 4,581,663 (Tanaka). Many problems have arisen with the employment of buried servo pattern arrangements as disclosed in the prior art, however, particularly since in both amplitude-based and frequency-based systems the same head is used to read both user data and servo information. Thus, serious problems arise in distinguishing one such type of information from the other, and amplitude-based servo systems experience other serious problems due to amplitude reduction accompanying increased track density, i.e., signal amplitude is lost as the track width decreases. Furthermore, amplitude detection errors naturally result from the employment of a servo layer which is "buried" directly beneath the user data. Frequency-based systems experience great difficulty in separating two different servo frequencies from one another and from the data signal frequency. While the Tanaka system appears to be time-based, its intended use is for a single data track. Hence, the use of the Tanaka system to function as a multiple-track positioning device is neither actually proposed nor clear once conceived.

SUMMARY OF THE INVENTION

The present invention provides novel and advantageous servo format techniques which are especially advantageous for use in multiple-track, high-density tape recording applications, particularly magnetic tape. In its broader applications, however, the novel servo formats and the technology by which they are implemented are also useful in other media and other record types, including, for example, optical or magneto-optical recording technology, and in various record types including disks.

In the present invention, a storage layer is disposed on or in a substrate to constitute a servo-tracking data record member which may assume either disk or tape form. The storage layer has the capacity to record and retain signal transitions recorded thereon, i.e., is configurable so as to store and convey data accessible from the surface of the record member, and has first and second edges defining the recordable field on the record member (which may or may not be the corresponding edges of the record member itself). A plurality of first servo segments, each of which is non-intersecting with the others, is recorded on or in the storage layer, preferably well below the upper surface of the record member (where user data is to be stored), within a first portion of the storage layer. A plurality of second servo segments, each of which is non-intersecting with one another, is also recorded on or in the storage layer, also preferably disposed well below the upper surface of the record member, in a second portion of the storage layer. Each of the first servo segments is complemented by one of the second servo segments and preferably intersects the latter to form a continuous servo line therewith extending substantially from the first edge of the recordable field to the second edge thereof, to provide continuous servo information from the first edge to the second edge while nonetheless utilizing a part of the storage layer upon which user data would not normally be written.

Additionally, the present invention provides novel and highly useful detection and decoding techniques which increase the system reliability while also maximizing the available number of recording tracks, and at the same time provides desirable system design and manufacturing economies.

Some of the more particular objectives, advantages and features of the invention are: to provide a servo tracking system based upon a servo format of novel configuration and character, which utilizes time-based positioning concepts and which provides for increased positioning accuracy even when used with very high track densities; to provide a servo tracking system which allows for maximally efficient use of a record member by freeing-up portions of the record member upon which data can be exclusively stored while specifically providing an optimal servo recording layer which does not interfere with the writing or reading of the data; to provide a servo tracking system that can, if desired, be completely contained on one side of the record member for optimal position control of data heads; to provide a servo tracking system which functions as a dedicated servoing system and yet does not compete with data for space on the same record member or require the use of a separate record member; to provide a servo tracking record member having first and second edges with continuous servo lines extending substantially across the record member from a point proximate the first edge to a point proximate the second edge, such that servo information is made available at any and all positions along the surface of the record member; to provide a guard band between data and servo patterns to protect the servo patterns from overwriting of data, thus preventing erasure of the servo patterns; and to provide an angular relationship between data lines and servo lines so that head azimuth effect will alleviate cross-talk between data gaps and servo gaps while nonetheless permitting the data lines and servo lines to be read simultaneously.

Additional features of the invention are the provision of highly advantageous phase detection and/or servo segment counting, used both to initially position data heads at selected track locations as well as to subsequently maintain proper data head alignment relative to an accessed data track during a read or write cycle; the provision of an encoded indexing system associated with the servo patterns to facilitate the techniques of determining and maintaining data head gap position; and the inclusion of novel calibration procedures, which may utilize a recorded calibration track of a type known heretofore for servo tracking purposes and in effect integrate the same into the new servo format and procedure provided herewith.

BRIEF DESCRIPTION OF THE DRAWINGS

FIG. 1 is an enlarged, fragmentary plan view of a record member embodying the servo pattern and data-storage system of the invention;

FIG. 2 is an exploded perspective view of the record member of FIG. 1;

FIG. 3 is an enlarged, fragmentary plan view somewhat similar to FIG. 1 but showing other aspects of the system;

FIG. 6, comprising FIGS. 6a, 6b and 6c, is a multiple-line timing diagram illustrating typical operation of a servo system in accordance with FIGS. 1 and 5;

DETAILED DESCRIPTION OF THE PREFERRED EMBODIMENT

Figure 5:
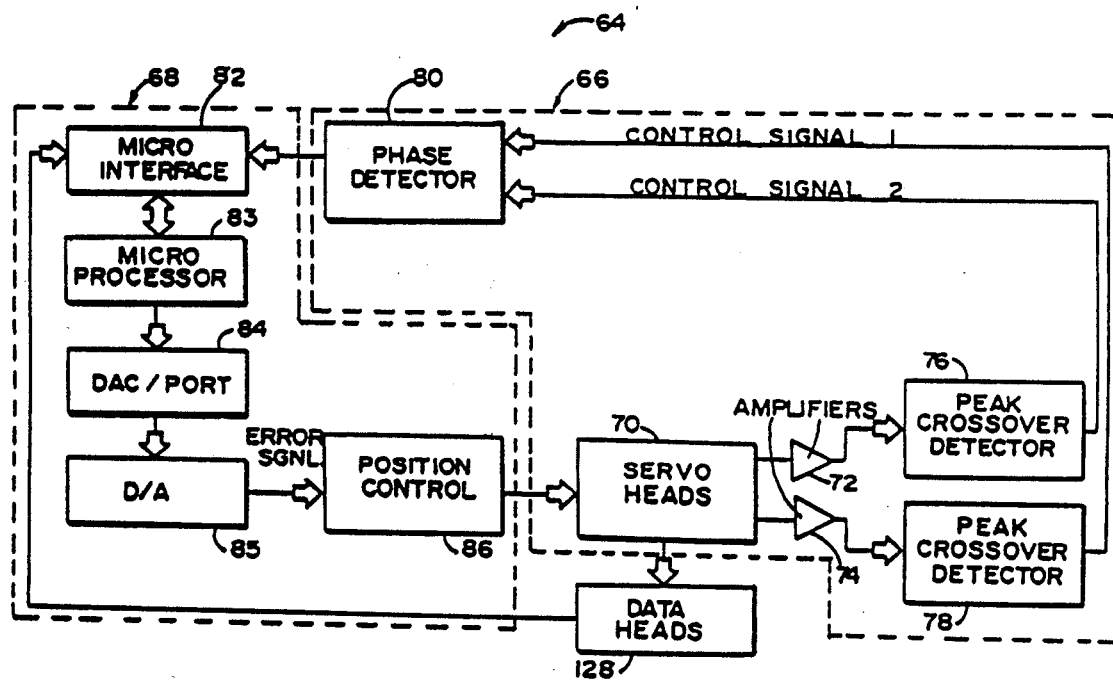
FIG. 5 is a system block diagram showing an illustrative implementation of a servo-positioning system in accordance with the invention.

For purposes of description herein, the terms "upper," "lower," "right," "left," "rear," "front," "vertical," "horizontal" and the like relate to the orientation of the subject matter as depicted in FIG. 1. However, it is to be understood that these terms are used for convenience and do not imply any specific or inherent attributes of the invention, which may assume various alternative orientations and step sequences, except where expressly specified to the contrary. It is also to be understood that the specific devices and procedures illustrated in the attached drawings, and described in the following specification, are simply exemplary embodiments of the inventive concepts and structures defined in the appended claims. Hence, any specific dimensions or other such physical characteristics relating to the embodiments disclosed herein are not to be considered as limitations of the invention unless the claims by their language expressly state otherwise.

Referring now in more detail to the drawings, FIG. 1 depicts a fragment of a servo-tracking record member 10 in accordance with the invention, which in the most preferred form is magnetic recording tape but which could also be a rigid or "hard" disk or one of the flexible or "floppy" type. A typical magnetic tape is of the type conventionally provided in cartridges; for example, "quarter-inch" tape, which is on the order of one-fourth inch wide, while disks, as used in data-processing applications, range from several inches to more than one foot in diameter. Both tape and flexible disks are usually formed of a non-magnetic base material with a thin magnetic recording medium deposited on either or both of the two opposite faces of the base. Such disks are accurately positioned for rotation in a fixed plane and rotated at high speed during operation so that each point on the disk passes before a recording/reproduction transducer at frequent intervals.

FIG. 1 illustrates schematically a fragment of record member 10 such as may be employed in practice of this invention. As illustrated therein, the record member 10 is represented as being linear in extent rather than curved as on the actual face of a disk in order to simplify the explanation. The extension of the principles disclosed to a curved record member such as a recording disk will be reasonably apparent to one skilled in the art, and as a matter of practice, the linear approximation of FIG. 1 is reasonably comparable to the outer bands of large disks.

The record member 10, as depicted in FIG. 1, generally comprises a non-magnetic substrate 12 (FIG. 2) upon which a storage layer 14 is disposed. The storage layer 14 includes a servo block 16, containing servo lines 18 which, in the most preferred embodiment, are "buried" below data blocks 20. Data block 20 contains a plurality of data tracks 22 having numerous data lines 23, which represent the magnetic transitions formed in the storage layer by operation of a magnetic transducer head. While only a fragment of one servo block 16 and a fragment of one data block 20 are shown in FIG. 1, in actual use a plurality of servo blocks 16 and data blocks 20 would typically be recorded on record member 10.

Each servo block 16, as illustrated in FIG. 1, includes a plurality of servo lines 18, each of which comprises a servo segment 26 which is complemented and mirrored about a centrally-disposed longitudinal axis 30 by a servo segment 28. Each of the servo segments 26 and 28 is skewed with respect to a transverse axis 32 by an angle alpha ($\alpha$), such that each servo block 16 has the appearance of a chevron. In other possible embodiments, servo lines 18 could assume other shapes besides the particular symmetrical sidewise "V's" of FIG. 1. To achieve the purposes of the present invention, nonetheless, it is preferable that each of the servo lines 18 extend substantially from one edge of record member 10 to the other (or at least across the recordable field thereon, should that be defined more narrowly), and that each of the servo segments 26 and 28 be angularly disposed with respect to one another. Preferably, such segments are also disposed at an angle with respect to vertical axis 32. As will be understood as the present discussion proceeds, minor discontinuities could exist in servo segments 26 and 28 without necessarily impairing the use of the present invention.

It should be noted that each servo block 16 preferably contains a fixed number, N, of servo lines 18, corresponding to N data tracks 22 contained in data block 20, to facilitate a preferred positioning system, the details of which are discussed below. In the present example, six or twelve data tracks 22 are illustrated in FIGS. 1, 2 and 3, although as will be understood a larger number than that could be implemented, even on relatively narrow tape.

Referring to FIG. 2, an exploded cross-sectional view of a preferred embodiment of record member 10, the servo lines 18 are shown buried beneath data tracks 22. Although servo lines 18, in another embodiment, could be written at another location in storage layer 14, i.e., in any other internal layer or on the outermost (surface) portion (for example, interposed between data blocks 20) in the present example servo blocks 16 are "buried" beneath data track blocks 20. As is well-known in the magnetic recording media art, storage layer 14 may be an oxide or other magnetizable material comprising one or more specific layers, carried on a structural substrate 12 (e.g., Mylar). As illustrated in FIG. 2, storage layer 12 is in effect (or in actuality) subdivided into three different levels or layers, namely, a first layer 114, overlying substrate 12, upon which servo segments 26 and 28 are written, a second layer 214 which is used to provide a "guard band" separating servo lines 18 from data tracks 22, and a third layer 314 in which data tracks 22 are written. These layers may in fact be constituted of different materials, each optimized for its particular intended function (i.e., servo versus data). To achieve the different types of recording in the different strata, servo segments 26 and 28 are "hard recorded" deep into the magnetizable layer 14, by using high-level write current and wide magnetic gap spacing, which force substantially the entire magnetizable layer 14 well into saturation. Preferably, a pair of elongated, angularly-disposed heads are used for this purpose, each covering half the overall width of the record member 10, at least where this comprises a tape.

That is, transducer heads of the type typically used to write servo segments and/or user data such as lines 23 in FIG. 2 use relatively narrow gap spacings and comparatively lower levels of write current, thus producing a shallower magnetic recording field, whereas the gap spacing (i.e., gap length) used to write "buried" servo segments 26 and 28 are substantially greater in the X direction (FIG. 2) than gaps used to read and write user data lines 23. Consequently, the "buried" servo segments 26 and 28 are initially written deeply into the magnetizable layer 14, so that the data lines 23 may subsequently be written over the top of servo segments 26 and 28 during subsequent recording passes, without erasing the servo lines, assuming of course that the data-write field is of the lower intensity typically used for data-writing purposes. Accordingly, the data lines 23 are thus in effect written along the surface of record member 10, where they may be erased and rewritten without affecting the underlying servo lines 18.

It is to be noted that, while perhaps not of the essence, the servo segments are desirably written at a significantly different frequency than the user data (e.g., 45 KHZ versus 4.5 KHZ); however, cross-talk between the servo heads and the data read head (as well as noise-suppression generally) is principally achieved by gap azimuth angulation, as discussed further hereinafter. To maximize this azimuth effect, the largest servo pattern angle and shortest servo write wavelength reasonably available should be used. Generally speaking, conventional techniques of shielding and filtering are used to reduce such adverse effects as cross-feed between the data-write heads and the data and servo-read heads during data-writing activities as well as cross-talk between the two servo heads during their read operation. The aforementioned comparatively wide difference between the servo-write frequency and the data-write frequency serves to enhance such filtering efforts.

In accordance with a preferred practice of the invention, after the servo lines 18 are initially recorded deeply into and throughout the storage layer 14 in the manner just described, a high-frequency bias, for example of about 1.5 MHZ, is applied to the aforementioned servo-writing heads (which may in fact be erase heads, even though used initially to write the servo segments) at a level less than that used to write the servo segments, to thereby erase the upper strata 214 and thereby create a guard band layer 214, which further aids in preventing subsequent erasure or modification of the remanent deeply recorded servo lines 18 during ensuing read-/write operations of the data lines 23 along data tracks 22. Actual experience has indicated that the creation of such a guard band aids in reducing interference and noise levels in the data-read signal due to the presence of the buried servo signals recorded beneath the data, and to generally enhance the results obtained despite frequent erasure and overwriting of data on the surface portion 314 of layer 14.

The deeply recorded "buried" servo lines 18 are, in the most typical embodiment, prerecorded in subsurface or layer 114 when record member 10 is initially manufactured, or in any event prior to use by the consumer, and remain in place throughout the useful life of the record member. Preferably, each of the elongated servo segments 26, 28 are recorded as a single step, for example by using elongated heads (gaps) as noted above, each of which writes a continuous servo transition extending across approximately one-half the width of the media. In other embodiments, however, shorter gaps could be used to write the servo segments, such as those shown in FIG. 3, by stepping them sequentially across the media in synchronized fashion and timing their excitation so as to record a succession of mutually aligned, generally continuous segments ultimately forming the distinctive patterns shown in FIGS. 1 and 2. Of course, in such a process, it is possible to leave unrecorded discontinuities along such servo segments, although this is not normally desired since it is usually deemed highly desirable to have continuous servo information available on a track-to-track basis, and that capability is one of the distinct advantages of the invention. With such a sequential process, however, it may be possible to create discontinuities in the guard bands 214, i.e., to create guard band areas over only the actual data tracks, and not over any space separating the data tracks (where that configuration is used), such that the servo segments extend throughout the storage layer 14 at such locations and provide very strong fields there.

It is regarded as desirable, although not essential, to use "buried" servo lines 18 with the angularly differentiated servo and data lines of the invention, since this maximizes the amount of data storage on the media. Of course, where this is done it is desirable to record the servo lines deeply enough within the oxide layer so that any interaction between servo lines 18 and data lines 23 is minimized; however, other measures described subsequently are also used in accordance with the invention to minimize such interaction.

In a preferred embodiment, N number of data tracks 22, each of which includes data lines (i.e., magnetic transitions) 23, are written in data block 20 using the head layout 38 pictorially shown in FIG. 3. Such a head layout is of a composite nature, including data heads generally designated by the numerals 40 and 42, as well as servo heads 44 and 46, which are interconnected in mutually fixed relation. As will be understood, data gaps 48 and 50 (and any additional such gaps 49 and 51) serve to read and write data lines 23, whereas servo gaps 60 and 62 at least read servo segments 26 and 28, respectively. To effect its intended purpose, composite head 38 is positioned with its magnetic gaps in contact with record member 10 where magnetic tape or "floppy" disks are used, whereas the heads are spaced from the recording media by an intervening air film where hard disks are used. In either event, the general alignment is as generally illustrated in FIG. 3. Data head 48 serves essentially the same purpose as data head 50, that is to read and write data lines 23 in separate tracks 22. In the present example, a composite data head 40 may comprise a first data gap 48 as well as a second and mutually-aligned data gap 49, while data head 42 comprises a similar first data gap 50 and second data gap 51, gaps 48 and 50 typically being for data-read purposes and gaps 49, 51 being for data-write purposes.

In the preferred embodiment under discussion, data lines 23 are written on the upper surface of storage layer 14 in horizontally-extending, parallel data tracks 22, and comprise vertically-oriented lines (short bursts) whose axes are disposed perpendicular to longitudinal axis 30 of record member 10 (which of course extends in the direction of motion of record member 10). Such data is written and read by use of a combination of the data gaps 48 through 51, i.e., each of data gaps 48 through 51 preferably possesses the capacity to read and write data tracks 22, so that write and read-after-write processes can be performed regardless of the direction of motion of record member 10. In the arrangement shown, an upper track 22' of data lines 23 can be written and read by data gaps 48 and 49 and a lower track 22" of data lines 23 can be written and read by data gaps 50 and 51. As will become evident as the present description proceeds, the servoing process can be achieved whether record member 10 is being traversed leftwardly or rightwardly.

Figure 4:
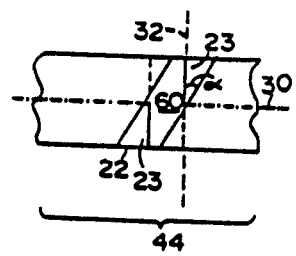
FIG. 4 is a fragmentary plan view of a small section of recording media on a reduced scale, showing relative transducer gap positioning.

The uses to which the associated data storage device can be placed are expanded by providing an array of data gaps analogous to those designated 48 through 51, inclusive. In the present example, data lines 23 are written and read in accordance with the positional orientation of data gaps 48 through 51, i.e., zero degrees with respect to vertical axis 32 (FIG. 4), although it will be understood that this specific orientation, as well as that in which the servo segments 26 and 28 are shown, is not particularly critical per se; that is, the angular relationship between the data lines and servo lines is the important aspect. In any event, data gaps 48 and 49, as well as data gaps 50 and 51, are fixed along an axis parallel to longitudinal axis 30 (FIG. 3), and data heads 40 and 42 are each aligned with separate data tracks 22. In the present example, data heads 40 and 42 may be conventional STP 6500 ferrite read/write heads, with glass-bonded surfaces to promote low wear and durability.

As further illustrated in FIG. 3, servo heads 44 and 46 include gaps 60 and 62. Each of gaps 60 and 62 is, in the preferred embodiment under discussion, skewed by the angle alpha with respect to vertical axis 32 (FIGS. 1 and 4) so that when servo heads 44 and 46 are vertically aligned and disposed transversely across longitudinal axis 30, servo gaps 60 and 62 are aligned with servo lines 26 or 28. As indicated previously, servo heads 44 and 46 are preferably coupled together (FIG. 3) and also coupled to data heads 40, 42 to facilitate their mutual alignment with the data tracks 22. Since in the preferred embodiment hereof data is written directly above the buried servo lines 18, cross-talk between data heads 40, 42 and servo heads 44, 46 should be substantially eliminated and, as discussed in further detail below, this is primarily accomplished by the angular differentiation between data lines 23 and servo gaps 60 and 62. The widths of data gaps 48 through 51, 60 and 62 in the X direction (actually, gap length; i.e., pole separation) is not a matter of particular concern, and it is quite suitable to use heads having gaps of conventional widths, thus avoiding any undue manufacturing costs. A typical size for the gaps in the data heads 40, 42 in the Y direction, which may be the same for each of the gaps 49 through 51, inclusive, is four mils, i.e., one track-width. A typical such dimension for the angularly-disposed servo gaps 60, 62 (which in the present example are the same), is twenty mils.

Data heads 40 and 42 are preferably connected physically with servo heads 44 and 46, such that positioning movement of servo heads 44 and 46 causes a corresponding movement of data heads 40 and 42. Such positioning movement is an integral part of the positional control of data heads 40 and 42 relative to data tracks 22; thus, as servo heads 44 and 46 are moved track-to-track in a direction transverse to longitudinal axis 30 (FIG. 3), data heads 40 and 42 are correspondingly moved with respect to the tracks 22. In a preferred embodiment, the range of movement of servo head 44 in the transverse direction is constrained to a portion of record member 10 disposed above longitudinal axis 30, and the range of movement of servo head 46 in a direction transverse to longitudinal axis 30 is constrained to a portion of record member 10 disposed below longitudinal axis 30. As a result of such constraints, servo segments 26 can only be read by servo gap 60 and servo segments 28 read only by servo gap 62. Accordingly, the data tracks 22 disposed above axis 30 are written and read by data head 40, while the data tracks 22 below axis 30 are written and read by data head 42. The mutually-connected servo heads 44 and 46 are positioned such that when they are centered about longitudinal axis 30 and record member 10 is transported past them, each continuous servo segment 18 (comprising an aligned pair of servo segments 26 and 28) is, in the ideal case, simultaneously aligned with servo gap 60 and 62, respectively.

Due to typical manufacturing tolerances, slight variations between the specific relative positioning of data heads 40 and 42 and servo heads 44 and 46 are likely to be encountered. Such variations in spacing give rise to offset error between data gaps 48 through 51 relative to data lines 23 as well as between servo gaps 60 and 62 and servo segments 26 and 28 when recorded media is interchanged between different drives. Furthermore, servo track-to-data track alignment changes occur as a function of such effects as thermal and humidity changes between the time of writing and reading the information, or upon re-reading it at subsequent points in time, and these changes also produce offset errors unless suitable measures are taken. It is possible to detect and compensate for such offset errors through employment of calibration tracks 24 (FIGS. 1 and 3). As illustrated, calibration tracks 24 are written in alignment with a corresponding pair of referenced data tracks 22' and 22". Calibration tracks 24 are preferably positioned at a beginning portion of a tape or at beginning portions of preselected zones or sectors throughout a disk. Due to the inherent variability of physical factors such as are caused by temperature and humidity, etc., periodic recalibration is necessary or desirable on a frequent basis. Also, recalibration is necessary as composite head 38 is repositioned toward inner radii of a disk. Calibration tracks 24 may comprise pairs of tribit tracks, pairs of amplitude bursts, or any other desired conventional servo information.

To detect offset error, servo heads 44 and 46 are centered about longitudinal axis 30 of record member 10, and a beginning portion of record member 10 is traversed past data heads 40 and 42. When servo heads 44 and 46 are disposed in this central alignment, data-read gaps 48 and 50 preferably align directly with calibration tracks 24. To the extent that data gaps 50 and 51 do not so align with calibration tracks 24, the amplitude of the read channel signal will be diminished proportionally and a signal corresponding to offset error may thereby be produced. Conversely, the data heads may be repositioned relative to the calibration track in a manner maximizing the resulting read channel signal, which occurs when exact read head-to-track alignment has been achieved. When this occurs, a phase difference will have been created with respect to the output from servo heads 44 and 46. This may be translated into a timing signal directly indicative of offset error, which may then be stored and used as a scale factor in subsequent positioning correction. The use of such a signal during the positioning of servo heads 44 and 46 to compensate for head offset is discussed in further detail below.

The skewed orientation of servo gaps 60 or 62, and servo segments 26 and 28, relative to data lines 23 and data gaps 48 through 51, is of particular significance in minimizing cross-talk between data heads 40 and 42 and servo heads 44 and 46. More specifically, cross-talk may be minimized as angle alpha (FIGS. 1 and 4) is increased. Of course, the preferred angular relationship between servo gap 60 and a corresponding single data line 23 or data gap 40 is the same as between servo gap 62 and the data lines and data gaps. Cross-talk between data heads 40 and 42 and servo heads 44 and 46 is minimized as "azimuth deviation" (FIG. 4) between the servo gaps 60, 62 and data lines is increased. In accordance herewith, azimuth deviation is optimized by skewing servo gaps 60, 62 with respect to data lines 23 until not more than an insignificant signal is detected from the traversal of a data line 23 past the servo gaps. Using this azimuth deviation, which in the present example corresponds to the angle alpha ($\alpha$), the servo gaps are skewed relative to the data gaps by an optimized deviation or, in other words, by an angle alpha, and servo segments 26, 28 are written such that the servo gaps 60 and 62 align directly with servo segments 26 and 28, respectively, whenever such servo segments are traversed past their respective servo gap. While a specific optimized azimuth deviation for servo gaps 60 and 62 with respect to the data gaps (i.e., the optimized angle alpha) is a question of many different factors, it may be said that in general an angle of 45° is likely to produce the best result, but good results may be obtained at shallower angles, e.g., approximately 30° (as a practical matter, the minimum angle alpha which is likely to produce effective detection discrimination is thought to be on the order of at least 20°).

Servo heads 44 and 46 comprise part of a positioning system 64 (FIG. 5) in which servo signals are generated as servo segments 26 and 28 are traversed past servo gaps 60 and 62. Such servo signals are used for generation of time-based positioning information in accordance herewith, since each time one of servo segments 26 or 28 crosses its corresponding servo gap 60 or 62, the resulting signals may be compared to indicate the difference in time between which such crossings occurred. It should be borne in mind that servo information is generated in accordance with the traversal direction of record member 10 relative to servo heads 60 and 62. In the present description, only the case for leftward traversal of record member 10 past gaps 60 and 62 is discussed, but it should be borne in mind that an equally full range of servo information is generated when record member 10 is traversed rightward relative to servo gaps 60 and 62, and such bi-directional movement is common to tape drives used for data storage. Moreover, azimuth deviation would remain unchanged whether the traversal of record member 10 is rightward or leftward, so that in either case cross-talk between data heads 40, 42 and servo heads 44, 46 would not present impairment in either the servoing or data-storage process. The capacity to achieve accurate servo-positioning in either direction of record movement is desirable, as discussed above, and is readily effected through appropriate programming of system 64. Thus, the traversals of servo segments 26 and 28 past servo gaps 60 and 62 generate time-based information which not only indicates the position of servo heads 44 and 46 with respect to the servo tracks 22, but which also indicates the position of the data heads 40, 42 with respect to a given data track 22.

It should be recognized that time-based servoing has distinct advantages over amplitude-based servoing. With time-based servoing, control is effected through knowledge that a particular magnetic transition has been encountered at a particular point in time, and the amplitude of signals associated therewith is virtually inconsequential. Detecting the occurrence of a transition is far simpler than quantifying its corresponding amplitude, which is affected by many different factors unrelated to positioning per se. For all intents and purposes, the accuracy of the time-based system is only limited by the ability to determine phase differences between pairs of detected signals. It is of particular significance that the many sources of error associated with measuring amplitudes is eliminated in time-based servoing.

It should be apparent by now that small discontinuities or imperfections in servo segments 26 and 28 would not necessarily impair servoing. For example, in the circumstance where part of servo segment 26 has a slight discontinuity along its length, so long as gap 60 detects any servo-transition, albeit a signal of lower level due to the presence of the discontinuity, etc., there is virtually no adverse affect on servoing. That is, it is the existence of the signal, rather than its amplitude, that makes time-based servoing possible. If a defect in a servo line encountered by servo gap 60 or 62 is small in relation to the length of either gap 60 or 62, the servoing process will virtually be unaffected.

Referring to FIG. 5, an exemplary positioning system 64 includes a detection sub-system 66 and a control sub-system 68, illustrated in block form. Referring to detection sub-system 66, output signals from servo gaps 60 and 62 (block 70), generated as servo signal block 12 on the record member 10 is traversed past servo heads 44 and 46, are fed to amplifiers 72 and 74 and the resulting amplified servo signals are inputted to, and correspondingly digitized at, peak/crossover detectors 76 and 78 to provide "Control Signal 1" and "Control Signal 2," respectively. Exemplary output levels from peak/crossover detectors 76 and 78 corresponding to Control Signal 1 and Control Signal 2 are illustrated in FIGS. 6(a) through 6(c) and constitute pulse trains. Upon inputting Control Signal 1 and Control Signal 2 into phase detector 80, the phase relationship between such signals is determined. In accordance with the present example, a phase difference signal associated with Control Signal 1 and Control Signal 2 is transmitted to microprocessor interface 82 in control sub-system 68.

In general, the phase difference signal outputted by phase detector 80 will reflect the position of servo gaps 60 and 62 relative to longitudinal axis 30. For example, when servo gaps 60 and 62 are symmetrically positioned about longitudinal axis 30 there will be no phase difference between the servo signals corresponding to Control Signal 1 and Control Signal 2 (FIG. 6[a]). As servo gaps 60 and 62 are moved away from this centered position, in a direction transverse to longitudinal axis 30, phase difference will increase, positively or negatively, depending on whether the inter-coupled servo heads 44 and 46 are moved up or down with respect to record member 10. As illustrated more specifically in FIGS. 6(b) and 6(c), when coupled servo heads 44 and 46 are moved up relative to record member 10 (FIG. 6[b]), pulses associated with Control Signal 2 will lead pulses associated with Control Signal 1, and when coupled servo heads 44 and 46 are moved down with respect to record member 10 (FIG. 6[c]), pulses of Control Signal 2 will lag behind pulses of Control Signal 1 (FIG. 6[c]).

Figure 7:
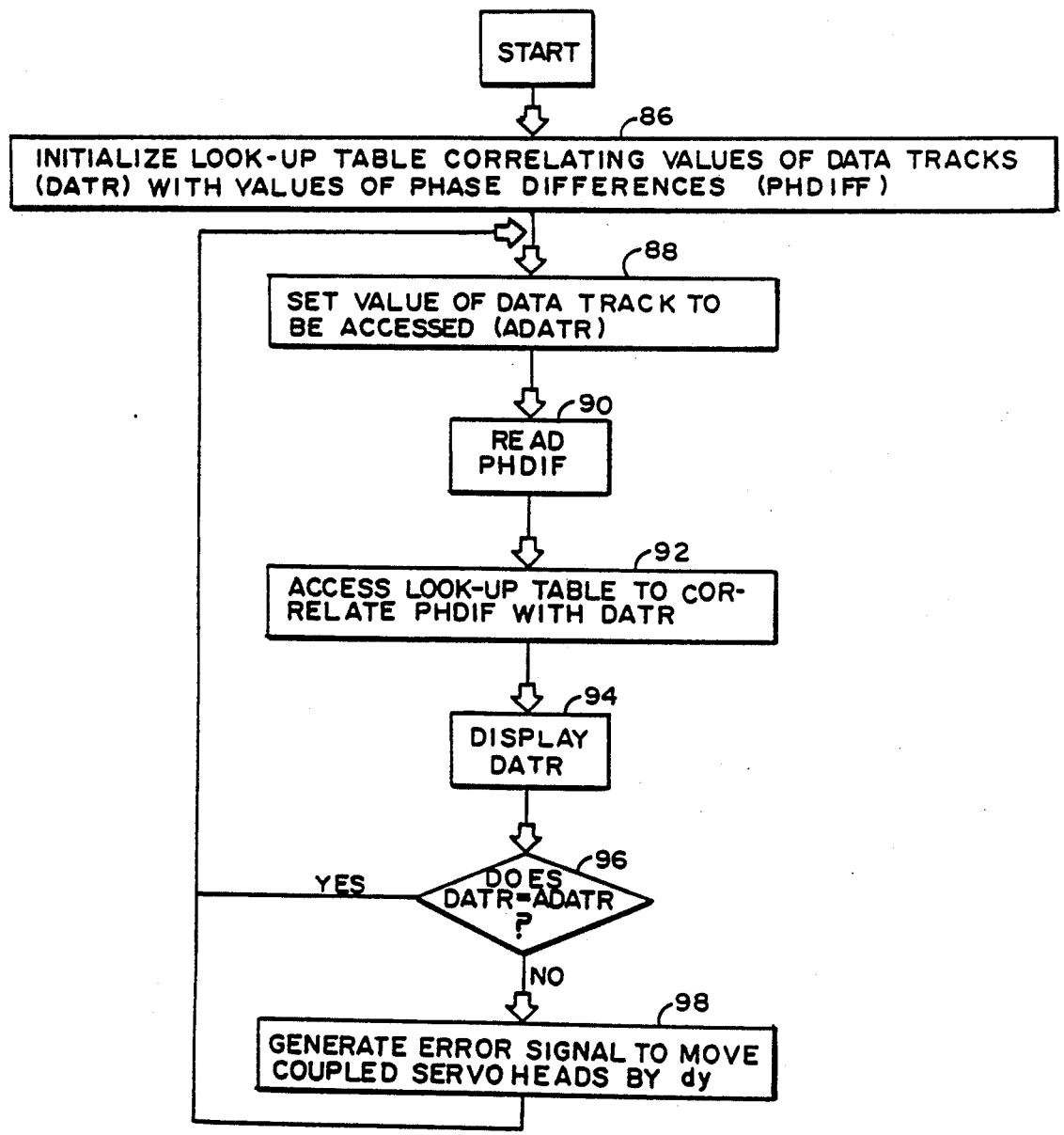
FIG. 7 is a flow diagram depicting a preferred system operation in accordance herewith.

The phase difference signal generated by phase detector 80 is transmitted to microprocessor interface 82 and inputted to microprocessor 84 for comparison with a reference signal stored in memory of microprocessor 84. FIG. 7 illustrates the logic employed to compare the phase difference signal with the reference signal, for generating an error signal employed to position servo heads 44 and 46.

In the present example, the aforementioned reference signal is generated by employment of a simple "look-up" table, which is initially stored in computer memory as illustrated at block 86 (FIG. 7). To compile the look-up table, values representative of particularly identified data tracks 22 (DATR), which in the preferred embodiment range from 0 to N, are stored along with the corresponding values of particular phase differences (PHDIF), i.e., predetermined values within the range of phase difference signal levels which may be transmitted from phase detector 80. To maintain the position of data heads 40 or 42 along a selected one of data tracks 22 (following initial positioning during a "seek" mode, described below), as record member 10 is traversed past servo heads 44 and 46 the phase difference signal generated from phase detector 80 is read at block 90 as PHDIF. Once the value of PHDIF is inputted into the microprocessor, as demonstrated at block 92, the look-up table is accessed to correlate PHDIF with its corresponding value DATR. For user convenience, the value of DATR determined at block 92 is displayed at block 94. Moving to block 96, the value of DATR is compared to ADATR. If DATR is either greater than or less than ADATR, an error signal for moving coupled servo heads 44 and 46 along a line parallel to vertical axis 32, by an increment dy, is generated at block 98, and the routine returns to block 88. If, on the other hand, DATR is the same as ADATR, the program will simply loop from block 88 to block 96, holding the value of DATR at ADATR until the user desires to move one of data heads 40 and 42 to another data track 22.

Figure 8:
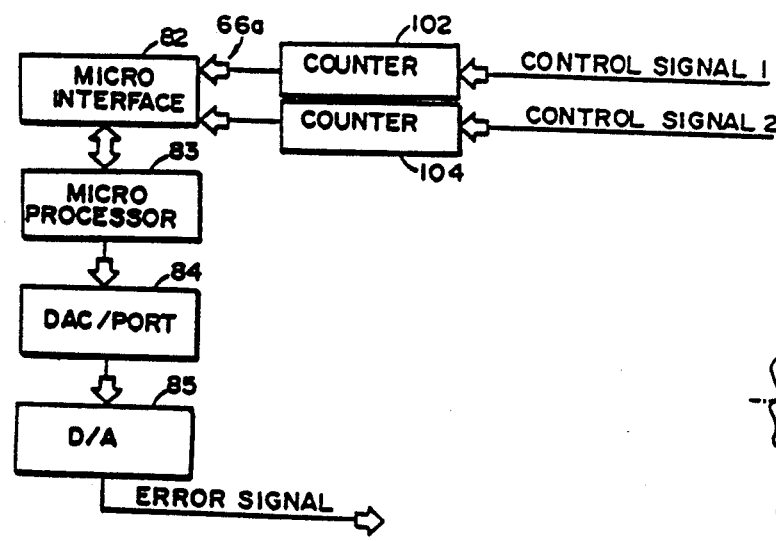
FIG. 8 is a block diagram similar to a portion of that shown in FIG. 5.

An additional portion 66a of the present servoing system 64 is shown separately in FIG. 8, although it should be understood that this subsystem is actually part of the overall system otherwise shown in FIG. 5; accordingly, common elements of the overall system 64 are given the same reference numerals as those used in FIG. 5. As shown in FIG. 8, subsystem 66a includes a pair of conventional digital counters 102 and 104 which operate to facilitate the initial positioning of servo heads 44 and 46 in the "seek" mode. That is, counters 102 and 104 are coupled in parallel with phase detector 80 of subsystem 66, and likewise receive Control Signal 1 and Control Signal 2; however, the use of such signals, and in particular those generated by detection of index servo segments 106 and 108, allows for initial or coarse position control of servo heads 44 and 46 during track "seek" operations, through use of a track-counting operation. As mentioned above, N servo lines 18 are preferably written for each servo block 16 and N data tracks 22 are written for each data block 20. Also, each servo line 18 is spaced apart from the next adjacent congruent servo line 18 an amount corresponding to the desired width of the data tracks 22, the significance of which will become more clear subsequently. Each servo block 16 may be indexed according to generally known techniques, e.g., by recording an additional servo segment 106 and an additional servo segment 108 at some desired point in the servo block, preferably near the beginning (FIGS. 1 and 2). Alternatively, one of the regularly-occurring servo segments 26, 28 may be omitted, either such approach providing a logic state identifying a particular location on the record member 10.

In a theoretical sense, the servo track counting system is initiated each time one or both of the index servo segments 106 and 108 crosses one or both of the servo gaps 60 and 62. When the inter-coupled servo heads 44 and 46 are centrally disposed along record member 10, i.e., centered with respect to longitudinal axis 30, index servo segments 106 and 108 are simultaneously sensed by servo gaps 60 and 62 as the various servo segments 26 and 28 are transported past the latter, and either of two data tracks 22 may be referenced (e.g., track 22' or track 22"). In this central position (FIGS. 1 and 3), the first such data track 22' is centrally positioned between 0 and $+\frac{1}{2}N$ and data track 22" is centrally positioned between 0 and $-\frac{1}{2}N$. Naturally, the particular data track 22 which is aligned with a given data head when servo heads 44 and 46 are centrally disposed with respect to the record member 10 is a function of the physical coupling between data heads 40 and 42 and servo heads 44 and 46. In a servo positioning system employing two or more laterally-spaced data heads, it will normally be desired to program the system so that only one such data head is activated to read or write at a given time, so as to access only a selected one of the two data tracks aligned with the two different heads. In the present example, system 64 may be programmed to effect such activation with respect to data heads 40 and 42, and may further be programmed to select either gaps 48, 50 or gaps 49, 51 for reading or writing operation as a function of the direction of motion for record member 10.

As servo heads 44 and 46 are moved as a unit upward from the centrally-disposed position referred to above, and as record member 10 is traversed past the heads, servo gap 62 is crossed by index servo segment 108 before servo gap 60 is crossed by index servo segment 106. Depending on the extent of such upward movement of servo heads 44 and 46, gap 62 may be crossed by two or more servo segments 28 prior to the moment when gap 60 is crossed by index servo segment 106. The number of servo segments 28 crossing over gap 62 is counted by digital counter 104. As soon as servo gap 60 does detect index servo segment 106, the difference in the relative number of servo segments 26 and 28 which have been crossed can be determined by use of counters 102 and 104 in conjunction with microprocessor 83 and, due to the correspondence between the spacing and angularity of servo lines 18 and data tracks 22, the particular data track 22 being accessed is readily identified by microprocessor 83. In the present example, as gap 60 is positioned toward an upper edge of record member 10, the numerical value of the data track 22 being accessed approaches either 0 or $+\frac{1}{2}N$, depending on whether the user is accessing a portion of record member 10 disposed above longitudinal axis 30 or a portion of record member 10 below longitudinal axis 30.

As inter-coupled servo heads 44 and 46 are moved downward and record member 10 is traversed by the heads, servo gap 60 is crossed by index servo segment 106 before servo gap 62 is crossed by index servo segment 108. Depending on the extent of downward deflection of servo heads 44 and 46, gap 60 may be crossed by two or more servo segments 26 prior to the moment that gap 62 is crossed by index servo segment 108. As in the above example, the data track 22 then being accessed can be readily identified from the difference in relative number of servo lines so crossed. As gap 62 is positioned toward a lower edge of record member 10, the numerical value of the data track 22 being accessed approaches $-\frac{1}{2}N$ (or N, depending on the convention used), as above, again depending on which portion of record member 10 that the user wishes to access. It should be evident that the index servo segments 106 and 108 are employed to fix the number of servo segments 28 to be subtracted from servo segments 26, or the number of servo segments 26 to be subtracted from servo segments 28 during the "seek" operation. Essentially, the number of servo segments 26 and 28 which cross servo gaps 60 and 62, and hence the number of servo segments 26 and 28 to be used in determining the relative difference in servo segments 26 and 28 crossed, is limited by the moment that both servo heads 60 and 62 have been crossed by at least one index servo segment 106 and 108.

As illustrated in FIG. 8, Control Signals 1 and 2, corresponding to the detected and amplified output from servo gaps 60 and 62, respectively, are inputted into counters 102 and 104 for determining the number of servo segments 26 and 28 which have crossed the servo gaps during the time period defined through the use of index servo segments 106 and 108. To those familiar with the art, various schemes for indexing a beginning portion of servo block 16 may be envisioned. The number of servo segments 26 and 28 counted prior to the crossing of both index servo segments 106 and 108 past servo gaps 60 and 62 is coupled to microprocessor 83 by microprocessor interface 82.

Figure 9:
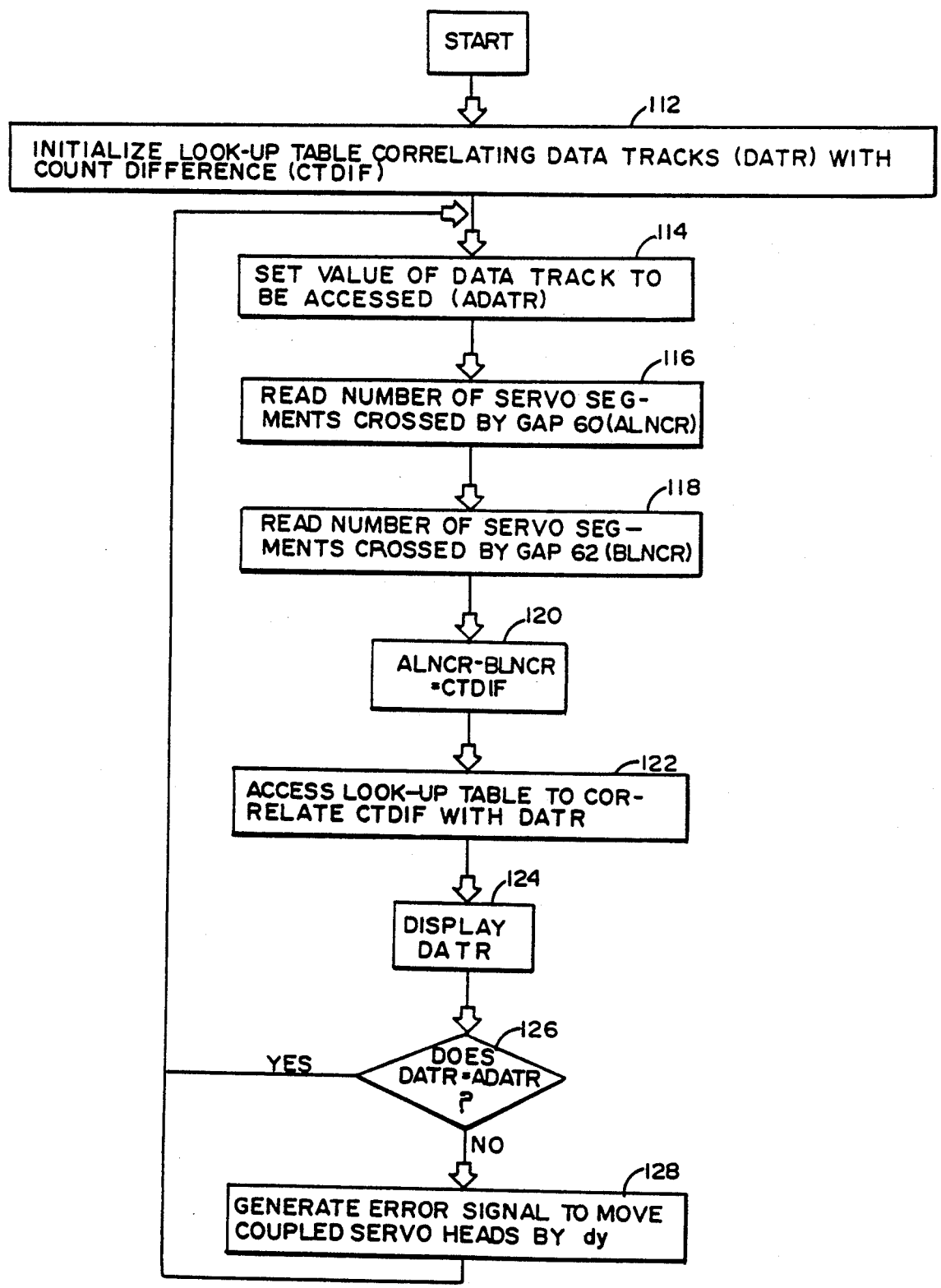
FIG. 9 is a second flow diagram which depicts the process followed during servo-positioning operations in accordance herewith.

The routine employed to generate an error signal in microprocessor 83 which is eventually outputted to position control 86 via DAC/port 84 and D/A 85 is illustrated in FIG. 9. Analogous with the routine illustrated in FIG. 7, a look-up table correlating data tracks (DATR) 0 to N with a count difference (CTDIF) is initially stored in the memory of microprocessor 83 at block 112. At block 114, the user sets the numerical value of the data track to be accessed by one of data heads 40 and 42. The program proceeds to read the number of servo segments 26 which cross gap 60 (ALNCR), at block 116, and the number of servo lines 28 which cross gap 62 (BLNCR) at block 118. Control proceeds to block 120 wherein BLNCR is subtracted from ALNCR to yield the product CTDIF.

As would be expected, if coupled servo heads 44 and 46 are disposed in an upward position with respect to the previously-mentioned central position, CTDIF will be positive, and if coupled servo heads 44 and 46 are disposed downward relative to the central position, CTDIF will be negative. The value of CTDIF is correlated with the look-up table, at block 120, to determine DATR which is displayed at block 124. Proceeding immediately to block 126, the value of DATR is compared to ADATR. If DATR is greater than or less than ADATR, an error signal is generated by block 128 for moving coupled servo heads 44 and 46 by an incremental length dy, corresponding to movement parallel to vertical axis 32, and the routine returns to block 114. If, on the other hand, DATR and ADATR are equal, then the routine continues to loop from block 114 to block 126 until a new value of ADATR is inputted.

In actual practice, it will be useful to employ phase detector 80 as well as counters 102 and 104 to initially position data heads 40 and 42 and subsequently maintain their desired position by correcting small-scale positioning errors of data heads 40 and 42 relative to data tracks 22 (i.e., in the "tracking" mode).

Position control 86, which is responsive to error signals generated by microprocessor 83, may be of any known type and typically comprises an actuator motor such as a stepper which is coupled, as by desired cams and/or linkages, to servo heads 44 and 46, to move the same as a function of the error signal. Upon receiving an error signal, position control 86 thus causes a corresponding change in position of servo heads 44 and 46, moving the same up or down, depending on the location of the particular data track 22 to be accessed. Servo heads 44 and 46 may be either directly connected to data heads 40 and 42 as an integral unit or otherwise slaved thereto. Thus, the movement of data heads 40 and 42 is effected by the position-control means for servo heads 44 and 46, i.e., position controller 86.

As noted above, data heads 40 and 42 are used to calibrate servo heads 44 and 46, to compensate for minor offset errors in the relative position of data heads 40 and 42 as well as that of servo heads 44 and 46 in relation to each other and to the data heads. To effect such compensation, as the calibration tracks 24 traverse data heads 40 and 42, a calibration signal, corresponding to the offset error between servo heads 44 and 46, is transmitted from data heads 40 and 42 to microprocessor 83 so that an error signal may be generated either on a periodic or generally continuous basis, whereby positional compensation is achieved for data heads 40 and 42 as well as servo heads 44 and 46.

It is to be noted that the present invention provides the advantage, in addition to those referred to above, of an integrated yet highly accurate servo-tracking system that not only allows the user to maximize the available surface capacity of data storage media, but also to have available continuous positioning information for the entire data storage area. Despite the extensive capabilities of the servo-tracking system provided, the record member 10, having prerecorded servo segments 26 and 28 disposed thereon, is actually simple in basic form, and is economical to manufacture. Additionally, since time-based servoing is employed, system resolution is optimized and data storage and retrieval performance is substantially enhanced.

In this regard, it should be noted that the above-described preferred one-to-one relationship of servo lines 18 in the servo blocks 16 to data tracks 22 extending across record member 10, while desirable, is not actually essential. Such a relationship does provide the distinct advantage of having (theoretically) exact coincidence between servo segment detection and data track centerline location, regardless of the particular ratio of servo segments 26 and 28 encountered at a given track location. This makes positioning control an easier matter, and eliminates certain prominent error sources; that is, while the interval between detection of one servo segment in relation to another could certainly be timed and divided in order to define track locations, such non-coincident procedure allows system inaccuracies or inconsistencies, non-linearity, etc. (e.g., speed changes in the record transport system and/or in the head-positioner response, electronics drift and noise, etc.), to produce potential error. Thus, the coincident-type system eliminates certain disadvantages and in fact provides certain positive advantages; for example, if servo signal detection coincidence reliably identifies track centerline, the derivative of that signal will reliably define the velocity of the moving heads during seek operation (assuming the speed of the moving record is either constant or otherwise known), thereby enabling more rapid head positioning with better control.

It is to be understood that the foregoing description of a preferred embodiment of the invention is provided for purposes of the description and illustration, and not as a measure of the invention, whose scope is to be defined by reference to the ensuing claims. Thus, while those skilled in the art may devise embodiments of the particular concepts presented in the foregoing illustrative disclosure which differs somewhat from the particular embodiment shown and described in detail herein, or may make various changes in structural details to the illustrated embodiment, all such alternative or modified embodiments which utilize the concepts of the invention and clearly incorporate the spirit thereof are to be considered as within the scope of the claims appended herebelow, unless such claims by their language specifically state otherwise.

The embodiments of the invention in which an exclusive property or privilege is claimed are defined as follows:

1. A servo-tracking data storage member, comprising:
   a movable record member having a recordable field area with the capacity to record and retain signal transitions recorded thereon, said recordable field having first and second edges;

a plurality of mutually-spaced first servo segments recorded on a first portion of said recordable field, said first servo segments being non-intersecting with each other, each of said servo segments originating proximate to said first edge and extending generally toward the second edge;

a plurality of mutually-spaced second servo segments recorded on a second portion of said recordable field, said second servo segments being non-intersecting with each other, each of said second servo segments originating proximate to said second edge and extending generally toward said first edge;

each of said first servo segments being paired with a particular one second servo segment and disposed along a line which converges with that of said particular one of said second servo segments at a fixed angle to thereby form a continuing sequence of said angles which is aligned along an axis disposed generally parallel to the direction of motion of said record member, and said first and second servo segments together transversing substantially all of said recordable field.

2. The servo-tracking data storage member of claim 1, wherein:

each of said servo segments is skewed with respect to an axis extending perpendicular to the direction of motion of said record member during recording operation.

3. The servo-tracking data storage member of claim 2, wherein said servo segments are skewed at an angle of at least about 20 degrees with respect to said axis.

4. The servo-tracking data storage member of claim 1, wherein said record member is magnetic recording tape.

5. The servo-tracking data storage member of claim 1, wherein said record member is a rotatable disk.

6. The servo-tracking data storage member of claim 1, wherein said servo segments comprise generally continuous recorded lines.

7. A servo-tracking data storage member having the capacity to record and retain signal transitions recorded thereon, comprising:

a record member comprising a storage layer disposed on a substrate, said storage layer having a first edge and a second edge, said storage layer being configurable so as to store and convey information accessible from a surface of said layer;

a designated first portion of said storage layer comprising a user data-recording field;

a plurality of mutually-spaced first servo segments formed in a second portion of said storage layer, said first servo segments being non-intersecting with one another;

a plurality of mutually-spaced second servo segments formed in a third portion of said storage layer, said second servo segments being non-intersecting with one another;

said first servo segments being intersected by said second servo segments at a uniform angle so as to create a plurality of points of intersection; and said first, second and third portions of said storage layer being separate and mutually-spaced from each other.

8. The servo-tracking data storage member of claim 7, wherein each of said first and second servo segments are skewed with respect to an axis disposed perpendicular to the direction of motion of the record member.

9. The servo-tracking data storage member of claim 8, wherein said first and second servo segments are skewed oppositely with respect to one another but at substantially the same angle.

10. The servo-tracking data storage member of claim 9, wherein said record member comprises a tape.

11. The servo-tracking data storage member of claim 9, wherein said servo lines are disposed at a depth in said storage layer beneath that of said user data-recording field.

12. The servo-tracking data storage member of claim 11, wherein said servo lines are disposed directly beneath at least portions of said user data-recording field.

13. The servo-tracking data storage member of claim 12, further comprising a guard band overlying said servo lines and underlying said user data-recording field.

14. The servo-tracking data storage member of claim 9, wherein said substrate comprises a disk, said first edge comprising an inner radius of said disk and said second edge comprising an outer radius of said disk.

15. The servo-tracking data storage member of claim 8, wherein at least certain of said first servo segments individually intersect certain of said second servo segments at a uniform angle and form generally continuous servo lines, said generally continuous servo lines extending substantially across said storage layer from said first edge to said second edge thereof.

16. The servo-tracking data storage member of claim 15, wherein said first servo segments and said second servo segments are each generally rectilinear in shape.

17. The servo-tracking data storage member of claim 15, wherein said substrate comprises a tape.

18. The servo-tracking data storage member of claim 15, wherein said substrate comprises a disk, said first edge comprising an inner radius of said disk and said second edge comprising an outer radius of said disk.

19. A positioning apparatus for data-storage devices, comprising:

a record member configurable to store and convey information and having first and second edges;

a plurality of first servo segments written on a first portion of said record member, said first servo segments being non-intersecting relative to each other and originating from points disposed along said first edge;

a plurality of second servo segments written on a second portion of said record member, said second servo segments being non-intersecting relative to each other and originating from points disposed along said second edge; said second servo segments intersecting said first servo segments at an angle so as to create a plurality of points of intersection;

detection means associated with said plurality of first servo segments and with said plurality of second servo segments to provide a series of first signals and second signals, respectively, corresponding to said plurality of first servo segments and said plurality of said servo segments;

comparison means coupled to said detection means to receive said first and second signals and determine timing differences therebetween; and positioning means operatively coupled to said comparison means for positioning said detection means with respect to the first and second portions of said record member as a function of said timing differences.

20. The apparatus of claim 19, wherein each of said first servo segments is skewed with respect to an axis perpendicular to the direction of motion of said record member by a first angle and each of said second servo segments is skewed with respect to said axis by a second angle.

21. The apparatus of claim 20, wherein said first and second angles are substantially the same in magnitude but are oppositely-directed.

22. The apparatus of claim 20, wherein said first and second angles have a magnitude on the order of at least about thirty degrees.

23. The apparatus of claim 20, wherein said detection means comprises first and second transducer heads, said first and second heads having longitudinal axes which are at substantially the same angle as said first and second servo segments, respectively, so as to be longitudinally registrable therewith when in superposition.

24. The apparatus of claim 23, wherein said first and second servo heads are physically coupled together in mutually fixed relationship.

25. The apparatus of claim 19, further comprising:
a calibration track comprising a sequence of calibration information recorded on said record member in predetermined positional relationship to said first and second servo segments;
a third detection means associated with said calibration track to provide calibration signals in response to detection of said recorded calibration information when said third detection means is aligned with said calibration track;
means locating said third detection means in fixed relation with respect to said detection means associated with said first and second servo segments; and
electrical circuit means for receiving said calibration signals and said servo signals and providing an output corresponding to servo head offset error for compensating subsequent servo detection signals.

26. The apparatus of claim 25, wherein said calibration information comprises a series of amplitude bursts.

27. The apparatus of claim 25, wherein said calibration track is disposed in alignment with a data-storage track located on said record member.

28. The apparatus of claim 27, wherein said third detection means comprises a transducer head adapted for reading and writing user data.

29. The apparatus of claim 19, wherein said comparison means includes a phase-comparator.

30. The apparatus of claim 19, wherein said comparison means includes means for producing a count difference between said first and second signals.

31. The apparatus of claim 30, wherein said comparison means further includes a phase-comparator.

32. The apparatus of claim 30, further comprising index means disposed on said record member for referencing a period of time over which both of said first and second servo segments are counted by said means for producing a count difference.

33. The apparatus of claim 29, including a plurality of data tracks defined on said record member and extending generally parallel to one another and to the direction of operating motion of said record member, and wherein said servo segments are arranged in blocks of at least N uniformly-spaced segments, said plurality of data tracks comprising a whole-number multiple of N.

34. The apparatus of claim 33, wherein said plurality of data tracks comprises N tracks.

35. The apparatus of claim 34, wherein said blocks of servo segments include at least one segment which is generally congruent with the others but which is asymmetrically located with respect to such others, such segment comprising an index means.

36. The apparatus of claim 19, including a plurality of data tracks defined on said record member, said data tracks extending generally parallel to each other and to the direction of operating movement of said record member; at least certain of said data tracks being superposed over at least certain of said servo segments.

37. The apparatus of claim 36, wherein said record member comprises magnetic recording tape.

38. The apparatus of claim 19, wherein said first servo segments are generally parallel to one another and said second servo segments are generally parallel to one another, and wherein said intersecting first and second servo segments are uniformly spaced, whereby said angles of intersection are uniform and have their apexes lying along a linear axis.

39. The apparatus of claim 38, wherein said first and second servo lines are continuous at said angles, such that each intersecting first and second servo line pair defines a V shape.

40. A method of positioning transducer heads in data-processing apparatus of the type which records and reproduces data on a movable record member, said method comprising the steps of:
providing first and second servo segments on said record member, said first servo segments being non-intersecting with each other and said second servo segments being non-intersecting with each other, said first and second servo segments being disposed at a uniform angle with respect to one another and with respect to a line extending perpendicular with respect to the direction of movement of said record member during recording operation, and said first and second servo segments each extending over at least a major portion of opposite halves of said record member;
detecting said first and second servo segments during said record member movement and producing first and second signals, respectively, corresponding to said servo segments;
comparing predetermined pairs of said first and second servo signals to determine timing differences therebetween; and
using said timing differences to position said transducer heads by moving said heads as a function of such differences.

41. The method of claim 40, further comprising the step of:
using first and second servo segments in the form of lines, and symmetrically positioning said first and second servo lines about a centrally-disposed axis extending parallel to the direction of motion of said record member, such that said first and second servo lines have a herringbone-like appearance.

42. The method of claim 41, wherein said first and second servo lines include matched pairs of such lines disposed along paths which intersect at uniform angles whose apexes fall along said centrally-disposed axis.

43. The method of claim 42, wherein said matched pairs of servo lines define a chevron-like pattern.

44. The method of claim 42, wherein at least certain of said matched pairs of servo lines are substantially uniformly spaced to provide a uniform timing base.

45. The method of claim 44, including the step of using said uniform timing base to define a plurality of generally parallel data-recording tracks on said record member extending generally parallel to said central axis.

46. The method of claim 45, including the step of using said uniform timing base to provide a corresponding member of uniformly-spaced data-recording tracks on said record member.

47. The method of claim 40, including the step of recording data along tracks extending generally parallel to said centrally-disposed axis by using data-recording transitions on said record member whose axes extend generally parallel to said line which extends perpendicular to said direction of record member movement.

48. The method of claim 47, including the step of recording said data in a stratum disposed closer to the surface of said record member than that in which said servo segments are located.

49. The method of claim 48, wherein at least part of said data is recorded in superposition over at least some of said servo segments.

50. The method of claim 40, wherein at least the majority of said servo segments each have the form of generally continuous lines.

51. The method of claim 42, wherein said record member is magnetic recording tape.

52. The method of claim 40, wherein said record member is a rotatable disk.

53. A method of positioning transducer heads in data-processing apparatus of the type which records and reproduces data on a movable record member, said method comprising the steps of:
providing first and second servo segments on said record member, said first servo segments being non-intersecting with each other and said second servo segments being non-intersecting with each other, said first and second servo segments being disposed at a uniform angle with respect to one another along any line extending parallel to the direction of motion of said record member during recording and extending over at least the opposite halves of said record member defined by a medial such parallel line;
detecting said first and second servo segments during said record member movement and producing first and second signals, respectively, corresponding to said servo segments;
comparing predetermined pairs of said first and second servo signals to determine timing differences therebetween; and
using said timing differences to position a data-writing transducer head so as to define and follow along a selected one of a plurality of data-recording tracks extending generally parallel to each other and to the direction of motion of said record member during recording operation; and
operating said data-writing transducer head to read and/or write data on said record member along said selected track while so following along such track.

54. The method of claim 53, including the steps of using uniformly-spaced pairs of selected first and second servo segments to generate uniform timing signals and using such uniform timing signals to define the relative spacing of said data tracks.

55. The method of claim 54, including the step of using said uniform timing signals to define said data tracks on a one-to-one coincident basis.

56. The method of claim 55, including the step of recording said data in a stratum disposed closer to the surface of said record member than that in which said servo segments are located.

57. The method of claim 56, wherein at least part of said data is recorded in superposition over at least some of said servo segments.

58. The method of claim 55, wherein said data is written as a sequence of elongated generally parallel transitions which are disposed at a uniform angle with respect to said servo segments.

59. The method of claim 58, wherein said angle has a magnitude of at least on the order of about thirty degrees.

60. The method of claim 58, including the step of recording said data in a stratum disposed closer to the surface of said record member than that in which said servo segments are located.

61. The method of claim 60, wherein at least part of said data is recorded in superposition over at least some of said servo segments.

62. The method of claim 61, wherein said angle has a magnitude of at least on the order of about thirty degrees.

* * * * *